United States Patent Office 2,776,956
Patented Jan. 8, 1957

2,776,956
COMPLEX COBALT COMPOUNDS

Christian Zickendraht, Binningen, and Arthur Buehler, Rheinfelden, Switzerland, assignors to Ciba Limited, Basel, Switzerland, a Swiss firm No Drawing. Application September 28, 1953,
Serial No. 382,868

Claims priority, application Switzerland October 24, 1952
12 Claims. (Cl. 260—145)

This invention relates to the manufacture of new cobaltiferous azo-dyestuffs.

The invention is based on the observation that new, valuable cobaltiferous azo-dyestuffs are obtained when agents providing cobalt are reacted upon monoazo-dyestuffs which contain no sulfonic acid and carboxyl group and correspond to the general formula (1) 

in which R indicates a hydroxybenzene radical attached to the azo group in ortho-position to the hydroxyl group, and A indicates a naphthalene radical which is attached to the azo group in adjacent position to the amino group, the dyestuff molecule containing a sulfone group having more than one carbon atom, or at least one acid amide group, preferably a sulfonic acid amide group, with the stipulation that R contains at the most a single sulfonic acid amide group.

The monoazo-dyestuffs corresponding to the above formula, which serve as starting materials for the present process, can be obtained from ortho-hydroxy-diazo compounds of the benzene series and aminonaphthalenes which couple in adjacent position to the amino group, both of these starting materials being free from sulfonic acid and carboxyl groups and one of these starting materials containing a sulfone group with more than one carbon atom (for example a benzyl or phenyl sulfone group), or a carboxylic acid amide group, or preferably a sulfonic acid amide group, which group may be present in the azo- or the diazo-component.

Such dyestuff components as contain a sulfone group can be obtained for example from the corresponding sulfinic acids or sulfinic acid salts or from corresponding sulfonic acid halides. For example, an alkali salt of a sulfinic acid can be reacted with alkyl halides which contain more than one carbon atom (especially alkyl bromides or iodides), or with aralkyl halides (especially aralkyl chlorides) to form the corresponding sulfones.

For the preparation of the ortho-aminophenol aryl sulfones an ortho-nitrochlorobenzene sulfonic acid chloride may suitably be condensed in the presence of a Friedel-Crafts catalyst, as for example ferric chloride or aluminum chloride, with or without the use of a suitable solvent such as carbon disulfide or the like, with the selected aromatic compound, which preferably belongs to the benzene series (for example with benzene, toluene, xylene, alkoxy-benzenes and the like), the chlorine atom bound in ortho-position to the nitro group in the resulting sulfone is replaced by a hydroxyl group by treatment with alkali or alkaline earth hydroxides and finally the nitro group in ortho-position to the hydroxyl group thus introduced is reduced by customary methods to the amino group. It is also possible instead of starting from the ortho-nitro-halogenzenzene-sulfonic acid halides, to proceed from the corresponding ortho-amino-hydroxy compounds, which already contain the amino and the hydroxyl group in the form of an oxazolone ring, in which case after the condensation to the sulfone by the Friedel-Crafts reaction it is only necessary to hydrolyze the oxazolone ring in order to arrive at the desired ortho-amino-hydroxybenzene-aryl sulfones. Especially valuable starting materials are, however, obtained from the corresponding dyestuff components which contain instead of a sulfone group a substituted or unsubstituted sulfonic acid amide group, which can be present in the radical R and/or in the radical A of the starting monoazo-dyestuff of the Formula 1; also two sulfonic acid amide groups can be present in the residue A, for example in the form of a substituent of the formula —SO$_2$—NH—aryl—SO$_2$NH$_2$. When the starting monoazo-dyestuffs contain two sulfonic acid amide groups, it is of advantage that at least one of them should be substituted.

As examples of ortho-hydroxy-diazo compounds of the benzene series which are applicable for the preparation of the monoazo-dyestuffs serving as starting materials in the present process, those may be mentioned which are obtainable from the following amines:

(a) (Diazo-components containing acid amide or sulfone groups): 2-amino-1-hydroxybenzene-4- or -5-ethylsulfone, 2-amino-1-hydroxybenzene-4- or -5-n-propyl sulfone, 2-amino-1-hydroxybenzene-4- or -5-isopropyl sulfone, 2-amino-1-hydroxybenzene-4- or -5-n-butyl sulfone, 2 - amino - 1 - hydroxy - 4 - nitrobenzene - 6 - phenylsulfone, 2-amino-1-hydroxy-4-chlorobenzene-6-phenyl sulfone, 2-amino-1-hydroxy-4-nitrobenzene-6-benzyl sulfone, 2 - amino - 1 - hydroxy - 6 - nitrobenzene - 4 - ethyl sulfone, 2-amino-1-hydroxy-6-nitrobenzene-4-benzylsulfone, also 3-amino-4-hydroxydiphenyl sulfone, 4-amino-3-hydroxydiphenyl sulfone, 2-amino-1-hydroxybenzene-4- or -5-benzyl sulfone, 3-amino-4-hydroxy-4'-methyl-1:1'-diphenyl sulfone, 3-amino-4-hydroxy-4'-methoxy-1:1'-diphenyl sulfone, 4-amino-3-hydroxy-4'-methyl-1:1'-diphenyl sulfone, 3-amino-4-hydroxy-4'-chloro-1:1'-diphenyl sulfone, also 2-amino-1-hydroxy-benzene-4-carboxylic acid amide and primarily 2-amino-1-hydroxybenzene-4- or -5-sulfonic acid amide and the corresponding -methyl-, -ethyl-, -isopropyl-, -n-butyl-, -secondary butyl-, -tertiary-butyl-, -β-hydroxyethyl-, -β-chlorethyl-, -benzyl-, -cyclohexyl-, -phenyl-, -parachlorophenyl- or -tolylamides, and also the corresponding -dimethyl-, -diethyl-, -dibutyl-, -N-methylphenyl- or -N-ethylphenylamides, also 4-nitro- or 4 - chloro - 2 - amino - 1 - hydroxybenzene - 6 - sulfonic acid amide, 4-methoxy- or 4-chloro-2-amino-1-hydroxybenzene-5-sulfonic acid amide, 6-chloro-2-amino-1-hydroxybenzene-4-sulfonic acid amide, 6-nitro-2-amino-1-hydroxybenzene-4-sulfonic acid amide and the corresponding alkyl- or arylamides.

(b) (Diazo-components free from acid amide and sulfone groups, which are to be coupled only with coupling components containing sulfonic acid amide groups or sulfone groups); 4-nitro-, 4-chloro- or 4-methoxy-2-amino-1-hydroxybenzene, 5-nitro-2-amino-1-hydroxybenzene, 4-chloro- or 4-methyl-5-nitro-2-amino-1-hydroxybenzene, 4-nitro - 6 - chloro - 2 - amino-1-hydroxybenzene, 4-nitro-6-acetylamino-2-amino-1-hydroxybenzene, 4:6 - dichloro-2-amino-1-hydroxybenzene, 6-nitro-4-acetylamino-2-amino-1-hydroxybenzene or 4-methoxy-5-chloro-2-amino-1-hydroxybenzene, 6 - nitro - 4-chloro-2-amino-1-hydroxybenzene, 6-nitro-4-methyl-2-amino-1-hydroxybenzene, 4:6-dinitro-2-amino-1-hydroxybenzene.

As azo-components there are concerned aminonaphthalene compounds which couple in adjacent position to the NH$_2$-group and which are free from sulfonic acid and carboxyl groups; according to the selection of the diazo-component, compounds of this type can be used which contain sulfone or sulfonic acid amide groups such as 2-aminonaphthalene-6-ethyl- or -phenyl sulfone, 1-aminonaphthalene-4- or -5-sulfonic acid amide, 1-aminonaphthalene-3-sulfonic acid methylamide, 2-aminonaphthalene-4-, -5-, -6- or -7-sulfonic acid amide and the corresponding alkyl- or aryl-amines, such as 1-aminonaphthalene-4- or -5-sulfonic acid methylamide or 2-aminonaphthalene-6-sulfonic acid methyl-, -isopropyl- or phenylamide, or aminonaphthalenes which are free from sulfone and acid amide groups, such as 6-bromo- or 6-methoxy-2-aminonaphthalene, 6-methyl-2-aminonaphthalene and primarily 2-aminonaphthalene. Instead of this latter component 2-aminonaphthalene-1-sulfonic acid can also be used, since this acid couples in 1-position with splitting off of the sulfonic acid group and therefore leads to the same starting dyestuffs as 2-aminonaphthalene itself (see U. S. patent application Ser. No. 307,566 of September 2, 1952, by Alfred Hagenboecker and Max Blumer).

The coupling of the diazo compounds, which are obtained for example by means of sodium nitrite and hydrochloric acid in the customary manner from the amines set forth above under (a) and (b), with the azo components which are concerned, can likewise be carried out in the customary manner, for example in a neutral or acid medium.

When the coupling reaction is complete, the dyestuffs can easily be separated from the coupling mixture by filtration, since they are in general of low solubility in water.

The treatment of the monoazo-dyestuffs, obtained according to the above description, with agents providing cobalt, takes place according to the present process suitably in a weakly acid, neutral and especially in an alkaline medium. It is to be recommended in general to use for one molecule of a dyestuff less than one atom of cobalt. As agents providing cobalt, complex cobalt compounds of aliphatic hydroxycarboxylic acids or dicarboxylic acids can be used, or also simple cobalt salts such as cobalt acetate or cobalt sulfate, or if desired also cobalt hydroxide.

The conversion of the dyestuffs into the complex cobalt compounds takes place with advantage in the hot, with or without excess pressure, if desired in the presence of suitable additions, for example in the presence of salts of organic acids, of bases, organic solvents or other agents promoting complex-formation.

A single dyestuff of the Formula 1 given above may be subjected alone to the metallization process set forth above. It is however also possible and in many cases advantageous (for example in order to obtain different color shades) to metallize in a corresponding manner a dyestuff of the Formula 1 in admixture with other metallizable monoazo-dyestuffs. In this case it is possible, but not at all necessary, that all of the dyestuffs present in the mixture are ortho-hydroxy-ortho'-amino-monoazo-dyestuffs. It is also possible to treat with cobalt in a corresponding manner, for example, a mixture of an ortho-hydroxy-ortho'-amino-monoazo-dyestuff and an ortho:ortho'-dihydroxy-monoazo-dyestuff or an ortho-carboxy-ortho'-hydroxy-monoazo-dyestuff. Especially valuable results are obtained with mixtures of a dyestuff of the Formula 1 and a dyestuff of the formula (2) 

in which R indicates a benzene radical free from sulfonic acid and carboxyl groups and bound to the azo group in ortho-position to the hydroxyl group and R₁ indicates the radical of an azo-component free from sulfonic acid and carboxyl groups and bound to the azo group in adjacent position to an amino or hydroxyl group.

The monoazo-dyestuffs of the Formula 2, which are concerned as starting materials with the dyestuffs of the Formula 1 for the modification of the present process last above mentioned, can be obtained by coupling ortho-hydroxy-diazo compounds of the benzene series with azo-components which couple in adjacent position to an amino or hydroxyl group. As examples of applicable diazo compounds of the benzene series there may be mentioned those which are obtainable from the following amines: aminophenols such as 6-acetylamino-4-nitro-2-amino-1-hydroxybenzene, 4-nitro- or 5-nitro-2-amino-1-hydroxybenzene, 4:6-dinitro- or -dichloro-2-amino-1-hydroxybenzene, 6-nitro-4-chloro-2-amino-1-hydroxybenzene, 4-nitro-6-chloro-2-amino-1-hydroxybenzene, 6-nitro-4-methyl-2-amino-1-hydroxybenzene, 6-nitro-4-acetylamino-2-amino-1-hydroxybenzene, 2-amino-1-hydrobenzene-4- or -5-methyl sulfone and the other 2-amino-1-hydroxybenzene sulfonic acid amides and sulfones set forth above. As coupling components there are concerned, for example, α- and β-naphthols such as 5-chloro-1-hydroxynaphthalene, 2-hydroxynaphthalene, 6-methoxy- or 6-bromo-2-hydroxynaphthalene, 1-acetyl-1-n-butyryl- or 1-benzoyl-amino-7-hydroxynaphthalene, 1-carbomethoxy- or 1-carboethoxyamino-7-hydroxynaphthalene, 5:8-dichloro-1-hydroxynaphthalene, also 4-methyl- or 4-tertiary-amyl-1-hydroxybenzene, 4-acetylamino-1-hydroxybenzene, preferably 1-phenyl-3-methyl-5-pyrazolone, 1-(2'-, 3'- or 4'-chlorophenyl)-3-methyl-5-pyrazolone, 1-phenyl-5-pyrazolone-3-carboxylic acid amides and primarily acylacetic acid arylamides such as acetoacetic acid anilide, 1-acetoacetylamino-2'-, -3'- or -4'-chlorobenzene and the aminonaphthalene compounds set forth above.

The new products obtainable according to the present process are complex cobalt compounds of monoazo-dyestuffs, which are free from sulfonic acid and carboxyl groups and contain one atom of cobalt in complex combination with two monoazo-dyestuff molecules of which at least one corresponds to the general formula (1) 

in which R indicates a hydroxybenzene radical attached to the azo group in ortho-position to the hydroxyl group, and A indicates a naphthalene radical which is attached to the azo group in adjacent position to the amino group, the dyestuff molecule containing a sulfone group having more than one carbon atom, or at least one acid amide group, preferably a sulfonic acid amide group, with the stipulation that R contains at the most a single sulfonic acid amide group. Especially valuable are such cobalt compounds as contain at least one dyestuff of this type which contains nitro groups.

These new products are also obtained when instead of the orth-hydroxy-ortho'-amino-monoazo-dyestuffs of the general Formula 1, the corresponding ortho-alkoxy- or ortho-acyloxy-ortho'-amino-monoazo-dyestuffs are treated with the agents providing cobalt under such conditions that the alkyl or acyl group of the ortho-alkoxy or ortho-acyloxy-ortho'-amino-azo grouping is split off.

The new dyestuffs containing cobalt are soluble in water and indeed are more soluble than the initial dyestuffs used for their manufacture. They are suitable for the dyeing and printing of a variety of materials, primarily however for the dyeing of animal material such as silk, leather and especially wool, but also for the dyeing and printing of synthetic fibers from superpolyamides and superpolyurethanes. They are primarily suitable for dyeing from weakly alkaline, neutral or weakly acid baths, in the latter case, for example, an acetic acid bath, and the dyebaths can obviously contain the customary dye auxiliary agents, for example distributing agents such as non-ionogenic reaction products of ethylene oxide upon fatty alcohols, also sodium sulfate, sodium pyrophosphate, polyphosphates and the like. The wool dyeings thus obtainable are distinguished by good levelling capacity, good fastness to light and very good fastness to washing, filling, carbonizing and decatizing and also by the particular purity of their shades, which are preserved in artificial light.

The following examples illustrate the invention, the parts being by weight unless otherwise stated, the percentages being by weight and the relation between parts by weight and parts by volume being the same as that between the kilogram and the liter.

*Example 1*

22.25 parts of 4-chloro-2-amino-1-hydroxy-benzene-5- parts by volume of 4 N-sodium nitrite solution and the whole slowly poured into 200 parts of an aqueous solution containing 5.4% of sulfuric acid and 15% of α-naphthalene-sulfonic acid, the temperature being maintained below +8° C. by external cooling. To the diazo compound obtained there are added with stirring 23.6 parts of 2-aminonaphthalene-6-sulfonic acid methylamide and the coupling mixture is heated to 45–50° C. After prolonged stirring at 45–50° C. the coupling is complete. The separated dyestuff is filtered off and washed with water.

4.01 parts of the resulting dyestuff are dissolved in 150 parts of water at 80° C. with the addition of 10 parts by volume of 2 N-sodium hydroxide solution and to the resulting solution are added 10 parts of a solution of cobalt sulfate with a cobalt content of 3.25 percent, followed by stirring for 30 minutes at 80–85° C. After this time the metallization is complete. The dyestuff is separated by addition of sodium chloride, filtered and dried. It forms a black powder which dissolves in water with a green-blue color and dyes wool equally well from a weakly alkaline, neutral or weakly acetic acid bath in full green-blue shades of good fastness properties.

Similar cobalt complexes, which dye wool from a neutral or acetic acid bath in green-blue shades, are obtained according to the method described in the above example when instead of the 2-aminonaphthalene-6-sulfonic acid methylamide used therein a corresponding quantity of 2-amino-naphthalene-6-sulfonic acid dimethyl-, β-hydroxyethyl- or phenylamide is used.

Example 5

3.87 parts of the dyestuff from diazotized 6-nitro-2-amino-1-hydroxybenzene-4-sulfonic acid amide and 2-amino-naphthalene and 4.25 parts of the dyestuff from diazotized 2-amino-1-hydroxybenzene-4-sulfonic acid methylamide and acetoacetic acid ortho-chloranilide are dissolved in 300 parts of water at 80° C. with the addition of 10 parts by volume of 2 N-sodium hydroxide solution. 20 parts of a solution of cobalt sulfate with a cobalt content of 3.25% are added and the whole stirred for half an hour at 80–85° C. When the metallization is complete, the dyestuff is separated by addition of sodium chloride, filtered and dried. It forms a green powder which dissolves in water with a green color, in concentrated sulfuric acid with a brown color and dyes wool equally well from a weakly alkaline, neutral or weakly acid bath in full yellowish green shades of good fastness properties.

Similar dyestuffs are obtained when the dyestuffs used in the above example are replaced by those set forth in columns I and II of the following table and the process is otherwise conducted in a similar manner. In column III is given the color shade with the corresponding cobalt mixed complexes obtained on wool from a weakly acid bath.

sulfonic acid amide are dissolved in 100 parts of water and 17.5 parts of 30% hydrochloric acid at 60-65° C. and the cooled solution diazotized at 0-5° C. with 6.9 parts of sodium nitrite. Into the diazo suspension there is allowed to run a hot solution of 15.7 parts of β-naphthylamine in 250 parts of water and 18.5 parts of 30% hydrochloric acid. Coupling is carried out at 35-40° C. The coupling is complete after 12 hours. The whole is heated to 90-95° C. and the dyestuff formed is filtered off. The filter cake is washed with hot water.

The dyestuff paste obtained is stirred in 500 parts of water at 80-85° C. and dissolved by addition of 40 parts of 30% sodium hydroxide solution. A solution of 15.4 parts of crystalline cobalt sulfate in 30 parts of water is added and the whole is stirred for 30 minutes at 80-85° C. After this time the complex formation is complete. The dyestuff is separated by addition of sodium chloride, filtered and dried. It forms a water-soluble black powder which dissolves in concentrated sulfuric acid with a violet color, in sodium carbonate solution with a blue color and dyes wool from a neutral or weakly acid bath in bluish gray shades of good fastness properties.

*Example 2*

23.3 parts of 6-nitro-2-amino-1-hydroxybenzene-4-sulfonic acid amide are dissolved in 300 parts of warm water with the addition of 4.4 parts of sodium hydroxide. After the addition of 25 parts by volume of 4 N-sodium nitrite solution, the warm solution is poured into a mixture of 40 parts by volume of 30% hydrochloric acid and 200 parts of ice, the temperature being maintained between 0° and +2° C. by the further addition of ice. Into the diazo suspension thus obtained is poured a hot solution of 15 parts of 2-aminonaphthalene in 11 parts by volume of 30% hydrochloric acid and 200 parts of water. After prolonged stirring at 35-40° C., the whole is heated to boiling and the separated dyestuff filtered off at the boil. When dried, it forms a brown-red powder which is practically insoluble in water but soluble in dilute sodium hydroxide solution with a red color and in concentrated sulfuric acid with a grey-blue color.

3.87 parts of the dyestuff so obtained are dissolved in 150 parts of water at 80° C. with the addition of 8 parts by volume of 2 N-sodium hydroxide solution. To the red solution obtained, 10 parts of a solution of cobalt sulfate with a cobalt content of 3.25% are added. After stirring for half an hour to one hour at 80° C. the metallization is complete. The dyestuff containing cobalt is separated by addition of sodium chloride, filtered and dried. The grey powder so obtained dissolves in water with a green color, in concentrated sulfuric acid with a violet color and dyes wool equally well from a weakly alkaline, neutral or weakly acid bath in full bluish green shades of good fastness properties.

*Example 3*

15.4 parts of 5-nitro-2-amino-1-hydroxybenzene are dissolved in 60 parts of water with the addition of 4 parts of sodium hydroxide, treated with 25 parts by volume of 4 N-sodium nitrite solution and the whole slowly poured into 200 parts of an aqueous solution containing 5.4% of sulfuric acid and 15% of α-naphthalene sulfonic acid, the temperature being maintained below +8° C. by external cooling. To the diazo suspension or solution which results there is added a hot solution of 22.2 parts of 2-aminonaphthalene-6-sulfonic acid amide in 12 parts of 30% hydrochloric acid and 60 parts of water. After prolonged stirring at 35-40° C. the coupling is complete. The separated dyestuff is filtered off and washed with water. When dried it forms a brown-red powder which is practically insoluble in water but dissolves in dilute sodium hydroxide solution and in concentrated sulfuric acid with red violet coloration.

3.87 parts of the resulting dyestuff are dissolved in 150 parts of water at 80° C. with the addition of 8 parts by volume of 2 N-sodium hydroxide solution and to the resulting solution 10 parts of a solution of cobalt sulfate with a cobalt content of 3.25% are added and the whole stirred for 30 minutes at 80-85°C. After this time the metallization is complete. The dyestuff is separated by addition of sodium chloride, filtered and dried. It forms a black powder which dissolves in water with a green-blue color, in concentrated sulfuric acid with a brown-red color and dyes wool from a weakly alkaline, neutral or weakly acetic acid bath in full green-blue shades of good fastness properties.

Similar dyestuffs are obtained when the monoazo-dyestuffs which are prepared from the diazo and coupling components set out in columns I and II of the following table are treated in the above described manner with agents providing cobalt. In column III the color shade of the cobalt complexes on wool is set out.

|   | I | II | III |
|---|---|---|---|
| 1 | 2-amino-1-hydroxy-benzene-4-sulfonic acid-methylamide. | β-Naphthylamine | grey. |
| 2 | 2-amino-1-hydroxy-benzene-5-sulfonic acid amide. | do | bluish grey. |
| 3 | 2-amino-1-hydroxy-benzene-4-sulfonic acid-isopropylamide. | do | grey. |
| 4 | 4-chloro-2-amino-1-hydroxybenzene-5-sulfonic acid amide. | 2-amino-6-methoxy-naphthalene. | greenish grey. |
| 5 | 6-nitro-2-amino-1-hydroxybenzene-4-sulfonic acid isopropylamide. | do | dark green |
| 6 | 3-amino-4-hydroxy-1:1'-diphenyl sulfone. | β-Naphthylamine | grey. |
| 7 | 4-nitro-2-amino-1-hydroxybenzene-6-sulfonic acid amide. | do | greenish grey. |
| 8 | 6-nitro-2-amino-1-hydroxybenzene-4-benzylsulfone. | do | Do. |
| 9 | 2-amino-1-hydroxybenzene-4-ethyl sulfone. | 2-aminonaphthalene-6-sulfonic acid methylamide. | grey. |
| 10 | 2-amino-1-hydroxy-benzene-4-sulfonicacid amide. | do | violettish grey. |
| 11 | 5-nitro-2-amino-1-hydroxybenzene. | 2-aminonaphthalene-6-sulfonic acid anilide-3'-sulfonic acid amide. | greenish blue. |
| 12 | 3-amino-4-hydroxy-1:1'-diphenyl sulfone. | 2-aminonaphthalene-6-sulfonic acid amide. | grey. |
| 13 | 4:6-dinitro-2-amino-1-hydroxybenzene. | do | greenish grey. |
| 14 | 4-chloro-6-nitro-2-amino-1-hydroxybenzene. | do | blue-green. |
| 15 | 4-nitro-6-acetylamino-2-amino-1-hydroxybenzene. | do | grey-green. |
| 16 | 2-amino-1-hydroxybenzene-4-carboxylic acid amide. | do | grey. |
| 17 | 5-nitro-2-amino-1-hydroxybenzene. | 1-aminonaphthalene-4-sulfonic acid methylamide. | blue. |
| 18 | do | 1-aminonaphthalene-5-sulfonic acid methylamide. | bluish green. |
| 19 | 4:6-dinitro-2-amino-1-hydroxybenzene. | 2-aminonaphthalene-6-sulfonic acid methylamide. | greenish grey. |
| 20 | 4-nitro-6-chloro-2-amino-1-hydroxybenzene. | 2-aminonaphthalene-6-sulfonic acid amide. | grey. |
| 21 | 6-nitro-2-amino-1-hydroxybenzene-4-sulfonic acid isopropylamide. | 2-aminonaphthalene. | bluish green. |
| 22 | 5-nitro-2-amino-1-hydroxybenzene. | 1-aminonaphthalene-3-sulfonic acid methylamide. | reddish blue. |

The 1-aminonaphthalene-4- and -5-sulfonic acid methylamides mentioned as coupling components in the above table can be obtained from 1-acetylaminonaphthalene-4- or -5-sulfonic acid chloride (see German patent specification No. 532,393, Example 2, and Berichte der deutschen Chemischen Gesellschaft, vol. 25, page 860) by treatment with methylamine and acid hydrolysis of the acetyl group.

*Example 4*

15.4 parts of 5-nitro-2-amino-1-hydroxybenzene are dissolved in 60 parts of water with the addition of 4 parts of sodium hydroxide, the solution treated with 25

| | I | II | III |
|---|---|---|---|
| 6 | Structure with OH, Cl, NO2, N=N, NH2, SO2NH2 | Structure with OH, N=N, HO-C-N-(C6H4-Cl), C=N-CH3, SO2-NH-CH3 | brown. |
| 7 | Structure with OH, N=N, NH2, SO2NH-CH-CH3/CH3 | Structure with OH, N=N, NH2, O2N | bluish grey. |
| 8 | Structure with O2N, OH, NO2, N=N, NH2, SO2NHCH3 | Structure with OH, N=N-CH(CO-CH3)(CO-NH-C6H5), SO2NH-CH(CH3)2 | yellowish olive. |
| 9 | Structure with OH, NO2, N=N, NH2, SO2NHCH3 | Structure with OH, N=N, OH, NHCOOCH3, NO2, CH3 | grey. |
| 10 | Structure with OH, NO2, N=N, NH2, SO2NHCH3 | Structure with OH, N=N, HO-C-N-(C6H4-Cl), C=N-CH3, SO2NHCH3 | olive. |
| 11 | Structure with OH, NO2, N=N, NH2, SO2NHCH3 | Structure with OH, N=N, OH, SO2NH-CH(CH3)2 | grey-blue |
| 12 | Structure with OH, NO2, N=N, NH2, SO2NHCH3 | Structure with OH, N=N, HO, Cl, SO2NH2, Cl | greyish blue. |
| 13 | Structure with OH, NO2, N=N, NH2, SO2NHCH3 | Structure with OH, N=N, NH2, NO2 | greenish blue. |
| 14 | Structure with OH, NO2, N=N, NH2, SO2NHCH3 | Structure with OH, N=N-CH(CO-CH3)(CONH-C6H5), SO2CH3 | green. |

| | I | II | III |
|---|---|---|---|
| 15 | (structure) | (structure) | greenish blue. |
| 16 | (structure) | (structure) | Do. |
| 17 | (structure) | (structure) | olive grey. |
| 18 | (structure) | (structure) | green grey. |
| 19 | (structure) | (structure) | khaki. |
| 20 | (structure) | (structure) | greyish blue. |
| 21 | (structure) | (structure) | grey. |

*Example 6*

0.5 part of the cobaltiferous dyestuff obtainable according to Example 1 is dissolved in 4000 parts of water and 100 parts of well-wetted wool are entered at 40–50° C. into the dyebath thus obtained. Then 2 parts of 40% acetic acid are added, the whole raised to boiling within half an hour and dyeing carried out for ¾ hour at the boil. Finally the wool is rinsed with cold water and dried. A uniform, bluish grey dyeing results of good fastness to washing and fulling.

Practically the same dyeing is obtained when no acetic acid is added to the dyebath.

A bluish grey dyeing is likewise obtained when instead of wool superpolyamide fibers (nylon fibers) are used.

*Example 7*

0.5 part of the cobaltiferous dyestuff obtained according to Example 3 is dissolved in 4000 parts of water and the solution heated to about 85–90° C. Into the hot dyebath thus obtained, 100 parts of wool are entered followed by raising to the boil and dyeing for ¾ hour at the boil. Finally the wool is rinsed with cold water and dried. A uniform green-blue dyeing of good fastness properties is obtained.

What is claimed is:
1. A complex cobalt compound which comprises a cobalt atom bound in complex union with two monoazo dyestuff molecules of which one is a member selected from the group consisting of an ortho:ortho'-dihydroxy- and an ortho-hydroxy-ortho'-aminomonoazo dyestuff free from sulfonic acid and carboxylic acid groups and the other corresponds to the formula

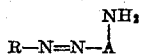

in which R represents a hydroxybenzene radical free from sulfonic acid and carboxylic acid groups and bound to the azo linkage in ortho-position to the hydroxyl group and A represents a naphthalene radical bound to the azo linkage in a position vicinal to the NH₂-group and free from sulfonic acid and carboxylic acid groups, the dyestuff molecule containing at least one of the substituents selected from the group consisting of a sulfonic acid amide group and a sulfone group with more than one carbon atom, at most one single sulfonic acid amide group being present in the radical R.

2. A complex cobalt compound which comprises a cobalt atom bound in complex union with two monoazo dyestuff molecules free from sulfonic acid and carboxylic acid groups, of which one corresponds to the formula

R—N=N—A—NH₂ and the other to the formula

R₁—N=N—R₂ in which formulae R and R₁ represent hydroxy-benzene radicals bound to the azo linkage in ortho-position relatively to the hydroxyl group, R₂ represents the radical of a coupling component bound to the azo linkage in a position vicinal to a hydroxyl group and A represents a naphthalene radical bound to the azo linkage in a position vicinal to the NH₂-group at least one of the radicals R and A containing a sulfonic acid amide group.

3. A complex cobalt compound which comprises a cobalt atom bound in complex union with two monoazo dyestuff molecules free from carboxylic acid and sulfonic acid groups and corresponding to the formula

R—N=N—A—NH₂ in which R represents a hydroxybenzene radical bound to the azo linkage in ortho-position to the hydroxyl group and A represents a naphthalene radical bearing the NH₂-group in a position vicinal to the azo linkage, one of the radicals A and R containing a single sulfonic acid amide group.

4. A complex cobalt compound which comprises a cobalt atom bound in complex union with two monoazo dyestuff molecules free from sulfonic acid and carboxylic acid groups and corresponding to the formula

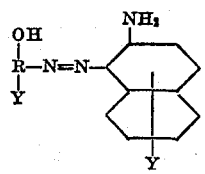

wherein R represents a nitrobenzene radical bound to the azo linkage in ortho-position relatively to the OH-group, one of the Y's represents a sulfonic acid amide group and the other Y a hydrogen atom.

5. A complex cobalt compound which comprises a cobalt atom bound in complex union with two monoazo dyestuff molecules free from sulfonic acid and carboxylic acid groups, of which one corresponds to the formula

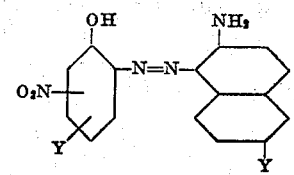

and the other to the formula

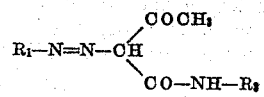

in which formulae R₁ represents a hydroxy-benzene radical bound to the azo linkage in ortho-position relatively to the hydroxyl group, R₃ represents a benzene radical, one of the Y's represents a sulfonic acid amide group and the other Y a hydrogen atom.

6. A complex cobalt compound which comprises a cobalt atom bound in complex union with two monoazo dyestuff molecules corresponding to the formula

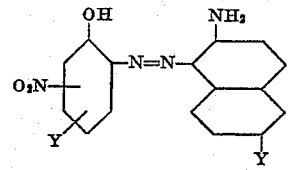

wherein one Y represents a substituted sulfonic acid amide group, the other Y being a hydrogen atom.

7. A complex cobalt compound which comprises a cobalt atom bound in complex union with two monoazo dyestuff molecules of which one corresponds to the formula

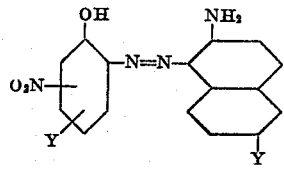

and the other to the formula

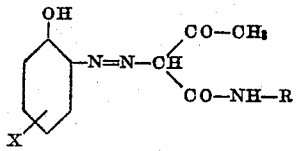

in which formulae R represents a benzene radical, X and one of the Y's each represents a substituted sulfonic acid amide group, the other Y being a hydrogen atom.

8. The complex cobalt compound comprising one atom of cobalt bound in complex union with two molecules of the monoazo dyestuff of the formula

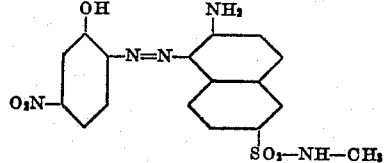

9. The complex cobalt compound comprising one atom of cobalt bound in complex union with two molecules of the monoazo dyestuff of the formula

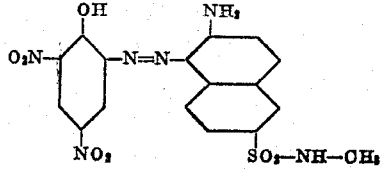

10. The complex cobalt compound comprising one atom of cobalt bound in complex union with two molecules of the monoazo dyestuff of the formula

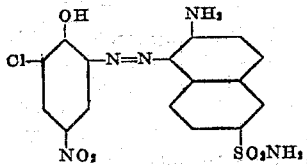

11. The complex cobalt compound comprising one atom of cobalt bound in complex union with two molecules of the monoazo dyestuff of the formula

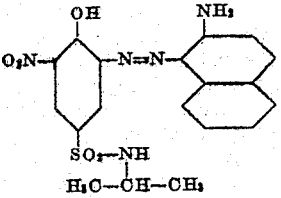

12. The complex cobalt compound comprising one cobalt atom bound in the complex union with one molecule of each of the dyestuffs of the formulae

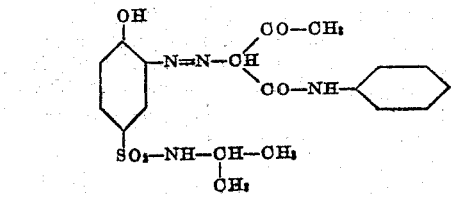

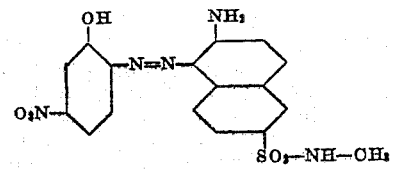

References Cited in the file of this patent
UNITED STATES PATENTS

| | | |
|---|---|---|
| 2,565,898 | Widmer et al. | Aug. 28, 1951 |
| 2,674,515 | Widmer et al. | Apr. 6, 1954 |